INVENTOR.
Serge A Scherbatskoy

INVENTOR.

Serge A Scherbatskoy

United States Patent Office 3,243,588
Patented Mar. 29, 1966

3,243,588
SCINTILLATION DETECTOR SYSTEM USING A WHITE LIGHT AS A STANDARD TO STABILIZE THE SYSTEM
Serge A. Scherbatskoy, 804 Wright Bldg., Tulsa, Okla.
Filed Aug. 17, 1962, Ser. No. 217,590
2 Claims. (Cl. 250—71.5)

This application is a continuation-in-part of my copend-detection and measurement of nuclear radiation such as alpha rays, beta rays, gamma rays, neutrons, etc., and in particular, it relates to a counter having greatly improved stability.

This application is a continuation-in-part of my copending application No. 762,890 entitled "Stabilized Scintillation Detector," filed September 23, 1958, and now abandoned. The present specification also embodies some subject matter in common with my copending applications No. 834,182 entitled "Stabilized Radiation Detector," filed August 17, 1959, now Patent No. 3,089,955, and No. 182,167 entitled "Stabilized Scintillation Counter," filed March 26, 1962, now Patent No. 3,218,460.

Scintillation counters are well-known and employ a scintillating crystal or phosphor of suitable material, such as sodium iodide or cesium iodide activated with thallium, or lithium iodide activated with europium, such phosphor being optically coupled to a photomultiplier. The photomultiplier in turn is usually connected to a linear amplifier, followed by a frequency meter or a pulse height selector. The photomultiplier is a well-known device in which a photocathode produces electric current in the form of space-borne electrons responsively to impingement of light, such current being amplified in a succession of following electrodes, by utilization of secondary emission. At the output of the photomultiplier, electric pulses generated in response to light flashes impinging on the photocathode have been amplified to a significant level, such that they can be measured or amplified further by means of a conventional linear amplifier.

One of the serious difficulties that are encountered when practical application is made of scintillation counters in caused by their relative instability. The amplification in a photomultiplier tube is proportional to the 8th or even higher power of the applied voltage, and in order to have stable amplification very precise regulation of the voltage is required. In addition, photomultipliers exhibit drifts with time and temperature. Furthermore, photomultipliers of the same type are not uniform in gain and vary considerably one from the other, and if a photomultiplier is broken or damaged and then replaced by another one of the same type, the replacement tube may be quite different in gain from the previous tube and can have a gain different by a factor of 2 or 3. It is necessary therefore to calibrate scintillation counters frequently, and the calibration in the higher mev. ranges is a tedious procedure because of lack of convenient standard monoenergetic sources. Good stability is especially necessary for gamma ray spectroscopy when the spectra are complex and there are no marker peaks that can be used for frequent recalibrations and corrections to the gain.

In the past, photomultipliers for scintillation counters have often been calibrated with standard light sources. A recognized procedure is first to illuminate the photocathode with a standard light source and calibrate the photomultiplier; i.e., make an output current measurement to determine the sensitivity. This measurement is then recorded on a calibration certificate or in a notebook. The photomultiplier is then illuminated with the scintillations from the scintillating crystal due to the impinging nuclear radiation and a certain signal intensity results. The output signal reading representing the magnitude of the impinging nuclear radiation is then also recorded in a notebook. By such a calibrating procedure it is possible: (a) to select photomultipliers for uniformity; (b) to correct the indications caused by measurements of the environing nuclear rays by appropriate factors that are determined from the calibration record. In these procedures, the voltages applied to the electrodes of the photomultiplier are maintained very constant and are supplied by some sort of precision regulated power supply so that, as the instrument is shifted from calibration procedures to measurement procedures, the sensitivity will not change. Such arrangements are cumbersome and the procedure tedious, and for some applications, as, for example, for continuous unattended monitoring of gamma radiation, they are completely impractical.

To overcome the difficulties caused by drifts and instabilities, I have invented a system in which the photocathode of the photomultiplier is illuminated continuously by a standard light source of very constant intensity while the unknown radiation is being measured, and during this constant illumination a photomultiplier pilot current is produced which in turn varies the voltages supplied to the photomultiplier electrodes automatically so as to readjust the gain and compensate for any drift. The instrument is thus continually maintained in exact calibration. An indicator therefore can show the magnitude of the unknown radiation at its true value and no correction procedures are required. In order to accomplish such automatic continuous stabilization, it is necessary to separate the pilot signal due to the standard light and the signal due to the impinging radiation, and to provide a circuit that will vary the photomultiplier gain responsively to variations in the pilot signal derived from the standard light and not to vary the gain responsively to the signal caused by the unknown radiation. I achieve this by controlling the photomultiplier gain in response to the photomultiplier pilot current; and my system is designed to separate the photomultiplier signal currents from the pilot current caused by the standard light. Such separation is not easy to achieve since both the currents come from the same photomultiplier. Furthermore, the current used for control purposes increases substantially the noise in the system, so that unless a special circuit is provided the counter become useless due to excessive noise.

I have devised an arrangement in which two circuits are provided for the photomultiplier; in one circuit appear voltages which are predominantly the control voltages due to the D.C. pilot current from the standard light; in the other circuit appears essentially the signal caused by the impinging unknown radiation. The design of the arrangement is such that variations in the current determining the control action have little effect on the signal developed in the channel conveying electric currents representing the unknown radiation and, conversely, variations in the signals that measure the unknown radiation have little effect on the control voltages. By the use of my invention, it is possible to provide an arrangement that will have good control characteristics and at the same time have low noise. By use of my circuit, noises as low as 10 kev. gamma ray equivalent have been achieved.

In my system I provide a variable gain arrangement in which the amplification of the photomultiplier is constantly controlled and maintained constant. The control action is derived from the magnitude of a pilot signal developed at the output of the photomultiplier and is produced in response to a standard illumination of the photocathode by a pilot source of very constant light.

In order to overcome the difficulties due to drift, a continuous and automatic control of the scintillation counter is necessary. In order to calibrate a scintillation detector and compensate for uncontrollable drift, it has been necessary in the past to interrupt the measuring process. Therefore, the detector was entirely ineffective as a measuring instrument during the time intervals used for calibration. Consequently, in the prior art during the performance of the scintillation detector, one was required to differentiate between two non-overlapping time intervals: The interval of calibration and the interval of measuring. My present invention overcomes this disadvantage and provides a continual control of the instrument during the time when the measuring process is performed.

It is a purpose of my invention to compensate for changes in the operation of a scintillation detector and to provide an automatic controlling arrangement that will insure the stability of operation of the device.

Other objects, together with some of the advantages to be derived in utilizing the present invention, will become apparent from the following detailed description taken together with the accompanying drawings in which.

Figure 1:
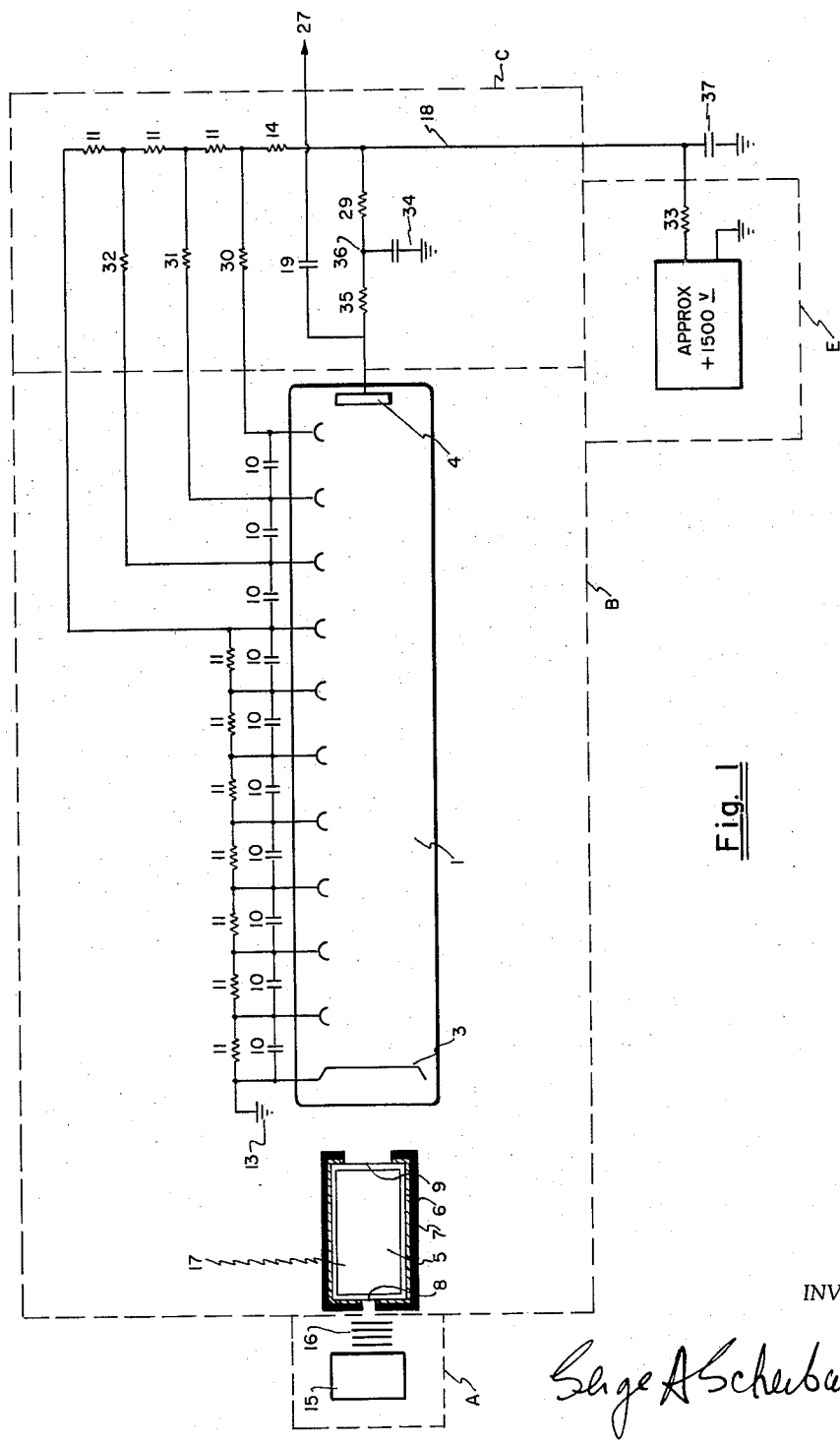
FIG. 1 shows a scintillation counter embodying the principles of my invention.

Consider now the diagrammatic arrangement of FIG. 1. Numeral 1 indicates a photomultiplier tube provided with a plurality of electrodes. Numeral 5 indicates a sodium iodide crystal. Numeral 6 indicates a case provided with an internal reflecting layer 7. Numerals 8 and 9 indicate transparent glass windows through which the crystal can be viewed. Numeral 3 indicates the photocathode, numeral 4 the anode of the photomultiplier 1 which is positioned so that the photocathode can view the light flashes through the glass window 9. The photomultiplier is provided with the conventional voltage divider network comprising resistors 11 and condensers 10 arranged so as to apply to each dynode an appropriate accelerating potential. Circuit point 13 is grounded and the last dynode receives its operating voltage from the potential dropping resistor 14. The photomultiplier anode and dynodes receive their supply voltage through resistor 33 and a conventional unregulated high voltage source 38.

A standard light source 15 is provided to illuminate the photomultiplier photocathode 3 through the windows 8 and 9. This standard light source emits light of very constant intensity. A preferred light source is an assembly comprising a fluorescent material such as, for example, zinc sulfide intimately mixed with an amount of radioactive material, as, for example, Hydrogen-3 or Carbon-14. It is important that the light source emit only light and not emit to its environment any nuclear rays such as gamma rays or bremsstrahlung, since such nuclear rays would irradiate the crystal and interfere with the measurement of the nuclear rays coming from the outside of the instrument. It is also important that the light source be sufficiently large and comprise a sufficient quantity of radioactive material so that fluctuations in the light intensity caused by the random nature of the radioactive disintegrations be minimized. Also, it is necessary that a sufficiently large quantity of fluorescent material be employed so that fatigue caused by long-term bombardment by the nuclear rays be minimized. By suitable design, it is possible to produce a source that will be essentially free from fluctuations and constant in intensity within 1% or 2% for a period of about 10 years. The construction of such a source, and particularly the requirement that it be free of fluctuations, usually results in one of intensity substantially stronger than required. An optical diffuser and attenuator 16 therefore is interposed between the light source 15 and the window 8. This diffuser, for example, can consist of 15 or 20 layers of .01" thick Teflon. This diffuser attenuates the light from the source 15 in a way which is preferable to the attenuation which can be achieved by means of a small orifice or diaphragm which would limit the effective part of the source 15 to a small exposed area, since such limitation would accentuate the statistical fluctuations in light intensity. The diffuser 16, on the other hand, allows the whole area of the source to participate. Furthermore, in the arrangement comprising layers of Teflon, the exact light intensity required can be achieved by increasing or decreasing the number of layers of Teflon.

A special circuit comprising resistors 29, 30, 31 and 32 is provided to control the amplification of the photomultiplier 1 by defocusing the electron streams therewithin.

The operation of the device is as follows: Nuclear rays 17 from the outside of the instrument impinge upon the crystal 5 and generate scintillations or light flashes in the well-known manner. These light flashes are translated into electrical pulses which appear at the anode 4 of the photomultiplier 1, and these electrical pulses are impressed upon the output terminal 27 through condenser 19.

Figure 3A:
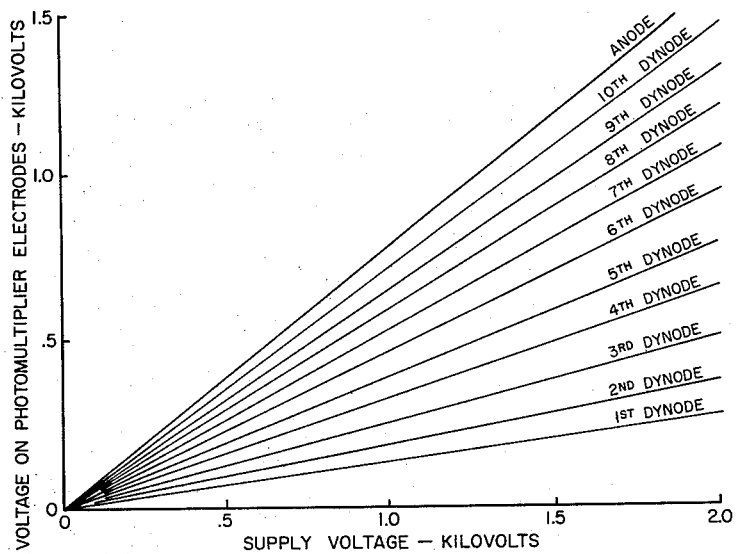
FIGS. 3a and 3b show diagrammatically the variation in the electrode potentials of the photomultiplier as a function of the magnitude of the high voltage supply.
Figure 3B:
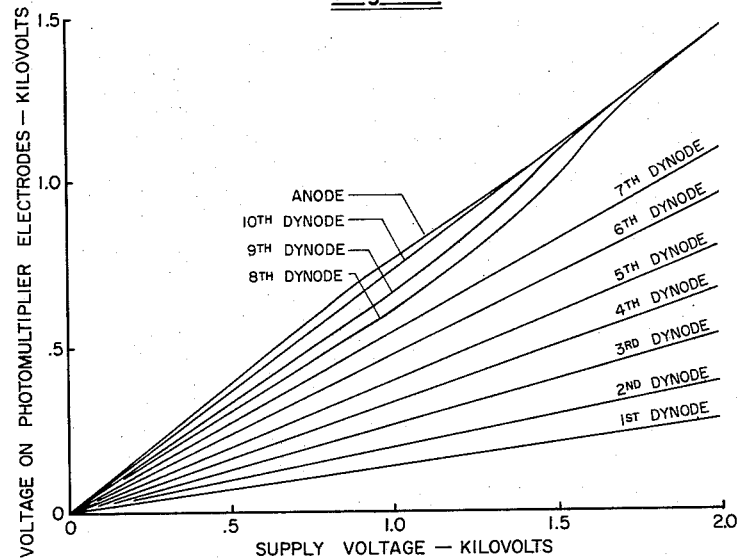

In addition to the function of pulse amplifier, the photomultiplier 1 also acts as a D.C. amplifier for the purpose of providing a stabilizing action by causing control of the inter-electrode accelerating voltages, and this operation is as follows: The photomultiplier 1 in the circuit of FIG. 1 acts as a variable gain pulse amplifier and the gain is controlled by defocusing the electron stream. Such defocusing is arranged to be controlled in response to pilot D.C. currents caused by the pilot light 15. FIGS. 3a and 3b show graphically how this gain variation is accomplished. FIG. 3a is a graph representing the variation of the voltages of the electrodes of the photomultiplier as a function of the supply voltage provided by the block E of FIG. 1 but with the pilot light 15 removed. The abscissas represent the supply voltage at circuit point 18 of FIG. 1 and the ordinates show the various voltages supplied to the photomultiplier electrodes as designated on the graph. The lines therefore indicate the voltages as they occur with the light source 15 absent; i.e., essentially in a normal ordinary photomultiplier circuit. The FIG. 3b shows the voltages of the electrodes when the light 15 is in position as shown in FIG. 1 and in particular the effect of the pilot light on the voltages of the anode, ninth dynode and eighth dynode. The first, second, third, fourth, fifth, sixth, seventh and tenth dynode voltages are not much influenced by the presence of the pilot light because these potentials are supplied from the relatively low resistance voltage-divider resistors 10 and 11. The tenth dynode voltage is relatively unaffected by the presence of the light because it is also supplied from a relatively low resistance source (resistor 30 having a value of approximately 10 megohms in the example of FIG. 1). The anode of the photomultiplier however receives its voltage supply through resistor 29 which is of high resistance and, in the example shown, has a value of 600 megohms. From the graph of FIG. 3b it is seen that after a supply voltage of about .8 kilovolt is reached the anode starts drawing appreciable current and the presence of the light from the pilot light 15 causes a reduction of the anode voltage and its value tends to approach the potential of the tenth dynode. As the anode potential approaches the potential of the tenth dynode the anode current tends to become more and more "cut off," and this causes a reduction in gain in the photomultiplier. Similarly, after a potential at circuit point 18 of approximately 1 kilovolt is reached the ninth dynode starts emitting a substantial D.C. current, and since the ninth dynode is supplied with operating potential through the high resistance of resistor 31 (500 megohms in the example shown) the potential of the ninth dynode tends to increase as shown in FIG. 3b and to approach the potential of the tenth dynode. The tenth dynode current therefore tends to become more and more "cut off" and this in turn causes a reduction in gain of the photomultiplier. Similarly, it is seen that after a supply voltage of 1.2 kilovolts is reached at circuit point 18 the eighth dynode tends to emit substantial D.C. current, and because the eighth dynode receives its operating potential through the relatively high resistance of resistor 32 (500 megohms in the example shown) this substantial D.C. current tends to increase the potential on the eighth dynode and this potential tends to approach the value of the ninth dynode as shown. This reduction in potential difference between the eighth dynode and the ninth dynode also tends to decrease the gain in the photomultiplier.

From FIG. 3b it is seen that after a certain potential (.8 kilovolt) of the supply voltage is reached the normal electric fields within the photomultiplier tend to become distorted because of the presence of the photomultiplier current caused by the light 15, and the potential differences between the anode, the tenth dynode, the ninth dynode, and the eighth dynode all tend to approach zero. (In some cases these potentials can reverse since it normally requires a small reversal of potential to completely stop the flow of electrons from one photomultiplier electrode to the next.) This distortion of the fields within the photomultiplier tends drastically to reduce the gain of the last three stages of the amplification and this reduction in gain counteracts the normal increase in gain which occurs when the supply voltage to an ordinary photomultiplier circuit is increased.

To illustrate my invention I have shown a circuit in which the potentials on only three electrodes of the photomultiplier are controlled by the pilot light. This is adequate in most cases. It will be apparent to those skilled in the art that the principles of my invention can be applied to the control of additional dynode potentials and in some cases five or seven or even all of the dynode potentials can be controlled by circuits similar to those shown.

Figure 4:
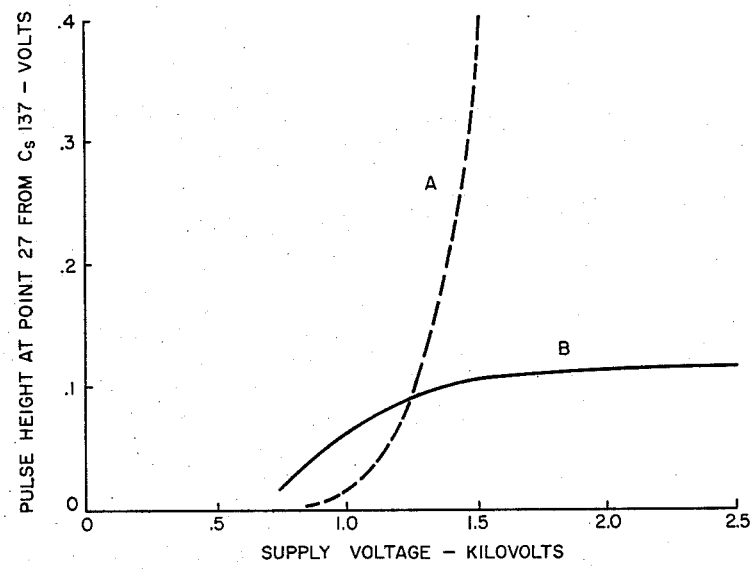
FIG. 4 shows the results of a test for determining the quantitative performance of the stabilized scintillation counter embodying the principles of my invention.

FIG. 4 illustrates the stabilizing action. It can be seen that with an ordinary counter (pilot light 15 absent, graph A) a change of about 10% in the supply voltage causes a photomultiplier gain change of about 300%. With my stabilized system (pilot light present, graph B) the same change in supply voltage causes a photomultiplier gain change of less than 3%. Thus extremely precise regulation of the supply voltage is necessary if one wishes the photomultiplier gain to be constant within an accuray of say ±10%. With the pilot light 15 present, however, as shown in Graph B, wide variations in supply voltage can be tolerated.

A very important feature of my invention is the fact that the photomultiplier gain is stabilized not only against supply voltage variations, but against variations in gain due to changes within the photomultiplier itself, such variations being caused by different photocathode sensitivities and changes in the secondary emission properties with time and small changes in the geometry of the dynodes, effects of small external magnetic or electric fields and changes in ambient temperature, and other such effects as were pointed out earlier. An individual photomultiplier tends to undergo changes during its life so that the amplification does vary with time. In addition to the fact that the gain of the photomultiplier does change during its life there is the fact that photomultipliers of the same type, manufactured by the same manufacturer, vary vastly one from the other. Thus if a photomultiplier tube is damaged or broken, replacing it by another causes changes in the sensitivity of the apparatus that must be compensated for by elaborate adjustments and calibrations. My invention obviates these inconveniences because for photomultipliers of the same type the defocusing provided by the circuit arrangement in Block C and the pilot light 15 of FIG. 1 will keep the effective photomultiplier amplification constant from one tube of the same type to another.

Figure 5:
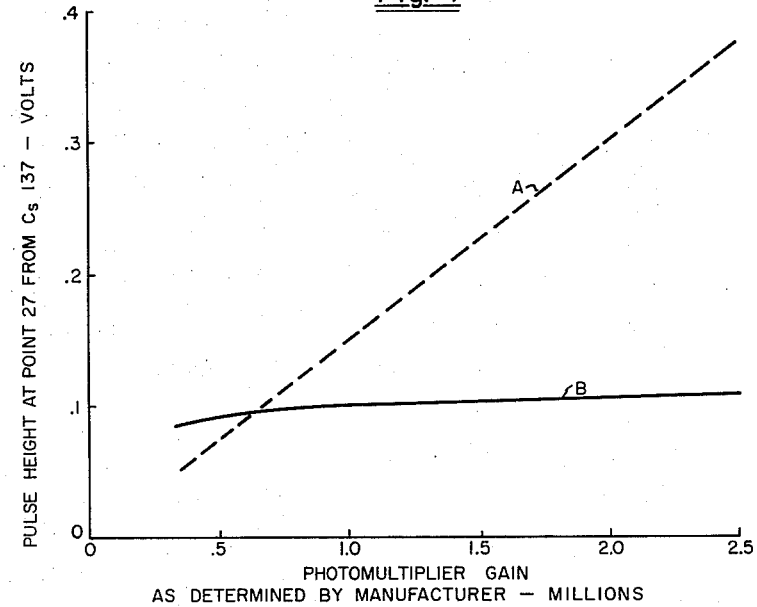
FIG. 5 shows the stabilizing effect of the principles of my invention on four different photomultipliers.

FIG. 5 shows this stabilizing performance. It is seen that the compensation achieved by my circuit is almost perfect; i.e., the effective amplification variation being only a few percent, whereas without my circuit the effective amplification variation is about 300%. FIG. 5 will be explained in greater detail later in the specification.

In order to describe the operating principle and the special considerations that are involved, it is desirable to refer again to the FIG. 1 in a more general way, and specifically to the dotted, enclosed blocks defining sections of particular function. Block A represents the very constant source of standard light which illuminates the photocathode of the photomultiplier in the scintillation counter. Block B represents a substantially conventional scintillation counter comprising a scintillating crystal and a photomultiplier with its associated voltage-divider circuit. Block C represents a control circuit for controlling the high voltage applied to the dynodes of the photomultiplier. Block E represents an unregulated source of high D.C. potential.

An important part of the invention consists in the voltage-controlling circuit comprised within Block C. As has been described previously in detail, the operation is as follows: When the electrode currents increase, the voltage drops across the resistors 29, 31, 32 change according to a definite pattern and these voltage drops cause in turn a corresponding change in the gain of the photomultiplier. It is seen, thus, that any increase in gain of the photomultiplier 1 tends to cause a defocusing action which in turn tends to decrease the gain. There is thus a compensating effect tending to stabilize the gain.

Figure 2:
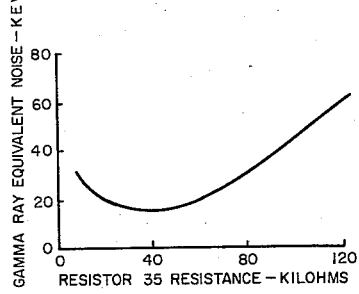
FIG. 2 shows diagrammatically the relationship between the gamma ray equivalent noise of the detector and the value of the resistance of one of the elements comprised in the detector circuit.

An important consideration is the selection of the correct ohmic value for the resistors 35 and 29. The problem consists in reducing the "noise" in the system. All scintillation counters have a certain amount of noise which determines a limit for the energy of the radiation that can be detected, and this noise can be expressed in thousands of electron volts gamma ray equivalent. Thus, if the noise in a scintillation counter system is said to be 10 kev., it is meant that the magnitude of the noise voltage pulses generated at the output of the counter is equal to the magnitude of the pulses that would be generated by 10 kev. rays impinging upon the crystal. Ordinarily, the presence of the light source in Block A tends to increase the noise in the scintillation counter substantially. The D.C. current caused by the light source fluctuates, and a certain amount of noise is generated by these fluctuations. The network comprising the resistor 35, condensers 34 and 19, and resistor 29 is designed to minimize this noise. It is apparent that resistor 29 should be of very large resistance, so that very small anode currents in the photomultiplier will cause a substantial change in anode voltage; in effect, quite large ohmic values for the resistor 29 provide the best control action of the circuit of Block C. It has been determined that a value of 600 megohms for the resistor 29 is close to the optimum when a conventional photomultiplier is used. Ordinarily, the noise developed across this 600 megohm resistor would, however, be very susbstantial and is in the neighborhood of 100 kev. gamma ray equivalent. In order to minimize this noise, the additional resistor 35 and condenser 19 are provided. As can be seen from the circuit, the D.C. potential generated by the D.C. anode current in the photomultiplier is developed primarily across resistor 29. For A.C. signals, however, the circuit comprising resistor 35 and condenser 19 effectively shunts resistor 29 and therefore the noise pulses and signal pulses are developed primarily across resistor 35. It can be seen that the D.C. resistance from circuit point 18 to photomultipier anode 4 is equal to resistance 29+resistance 35. The high frequency A.C. resistance between circuit point 18 and photomultiplier anode 4 is essentially only resistance 35, and the pulse potentials supplied to the output terminal 27 are essentially developed only across resistor 35. It is seen that for pulses the circuit point 36 is bypassed to ground by the condenser 35, and the noise pulses and signal pulses are therefore developed only across resistor 35. These pulse signals are then applied to the output terminal 27 through condenser 19. By careful experiments it was determined that an optimum value for resistor 35 is about 30,000 ohms, and with the circuit shown, the noise at the output 27 due to the presence of the light source in Block A is of the order of 8 kev. gamma ray equivalent. With the combination of resistance 29 equal to 600 megohms and resistance 35 equal to 30,000 ohms, it is possible therefore to provide a stabilized scintillation counter that will have low noise, and therefore will be entirely satisfactory for the measurement of X-rays and gamma rays above about 40 kev. The optimum ohmic value of the resistor 35 is best determined by experiment. It is obvious that if the rise-time of the pulse circuit enclosed in Block C and the following amplifiers were infinitely short, extremely low ohmic values for the resistor 35 would provide the best results. In practice, however, the rise-time of the amplifiers is finite and the various distributed capacitances in the necessary wiring, etc. are also finite. An overall measurement is therefore desirable to determine the actual noise developed at the point 27. These measurements are represented graphically in FIG. 2 in which the abscissas represent the values of the resistance of resistor 35 and the ordinates represent the corresponding values of the gamma ray equivalent noise of the detector. It is seen, as a result of the measurement illustrated in FIG. 2, that the optimum value of the resistor 35 is in the vicinity of 30,000 ohms.

In addition to the reduction of noise, there is the determination of the overall stability that can be achieved. In order to determine this stability quantitatively, two series of tests were made. In the first test the high voltage generated by the Block E was deliberately varied over a wide range and the gain of the photomultiplier was measured by measuring the heights of pulses caused by an external monoenergetic gamma ray source (such as Cesium-137). The results of these measurements are shown in FIG. 4. These measurements are represented by means of two graphs, "A" and "B." In the graph "A" the abscissas represent the magnitude of the supply voltage provided by the Block E of FIG. 1 and the ordinates represent the photomultiplier gain when the pilot light 15 is absent. In the graph "B" the abscissas are the same as those for the graph "A" and the ordinates represent the photomultiplier gain when the light 15 is in position as shown in FIG. 1.

Another test for making quantitative performance evaluation consists in placing into the circuit various photomultipliers. For this purpose, 4 photomultipliers were selected having nominal "gains," as determined by the manufacturer, of 460,000; 620,000; 1,100,000; 1,600,000. The results of these tests are illustrated diagrammatically in FIG. 5 in which the abscissas represent the photomultiplier gain and the ordinates represent the height of pulses at the circuit point 27 which are obtained when the scintillating phosphor is irradiated by Cs-137 gamma rays. It is seen from FIG. 5, graph B, that the maximum increase in pulse height for such drastic changes in the photomultiplier "gain" is of the order of 5%. In an ordinary circuit without the compensation (graph A), replacing one photomultiplier by another having approximately 4 times the gain would result in 4 times the pulse height at the output of the scintillation counter.

The above description explains the manner of operation of my invention in a specific arrangement which I believe is particularly adapted to a clear explanation. In the embodiment which I have chosen to illustrate this invention, I have shown an arrangement in which 3 photomultiplier interelectrode potential differences are varied in order to achieve the control action. It is not necessary to vary 3 interelectrode potential differences, and control action can be achieved by varying only the potential difference between a single pair of photomultiplier electrodes. Quite acceptable results can be achieved by varying only the potential difference between a single pair of dynodes or between the first dynode and the cathode or between the last dynode and the anode. It is apparent, for example, that by varying the potential difference between the last dynode and the anode of the photomultiplier good control action can be achieved over a more restricted range of supply voltage variations or photomultiplier gain variations. If it is required to achieve stabilization only over a range of photomultiplier gain variations corresponding to factors of 2 or 3, acceptable results can be achieved in controlling the scintillation counter by varying only the potential difference between the last dynode and the anode of the photomultiplier, or between an adjacent pair of dynodes. It will also be apparent to persons familiar with the art that varying the potentials on more or all electrodes can produce better results. Such modification and many other modifications and variations can be made.

Figure 6:
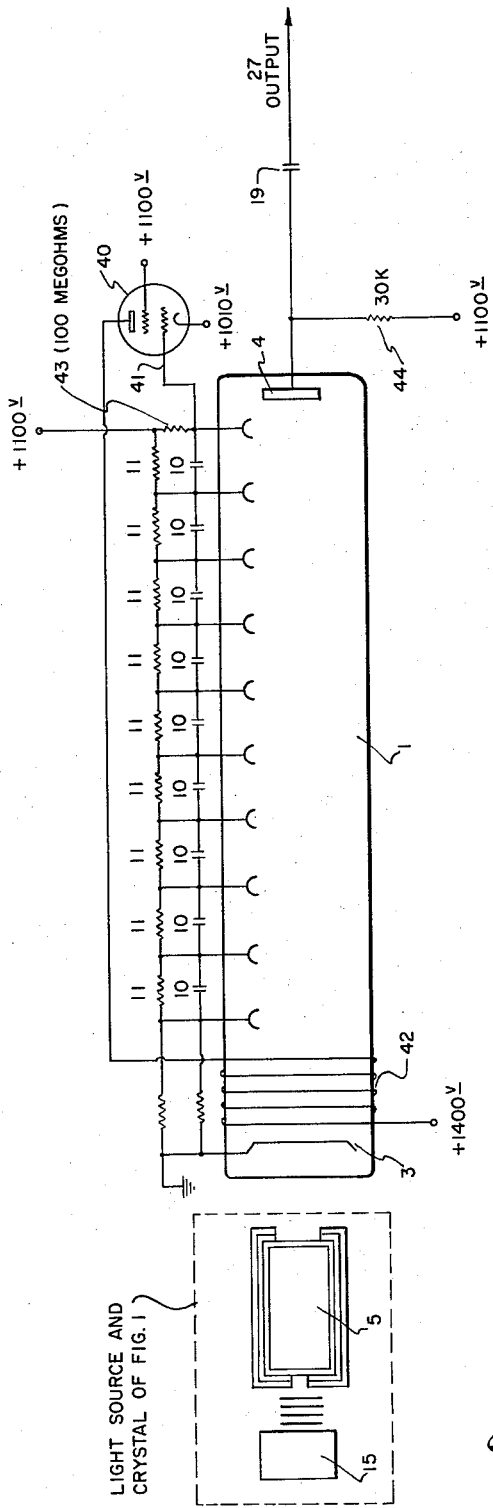
FIGS. 6 and 7 illustrate modified embodiments of my invention.
Figure 7:
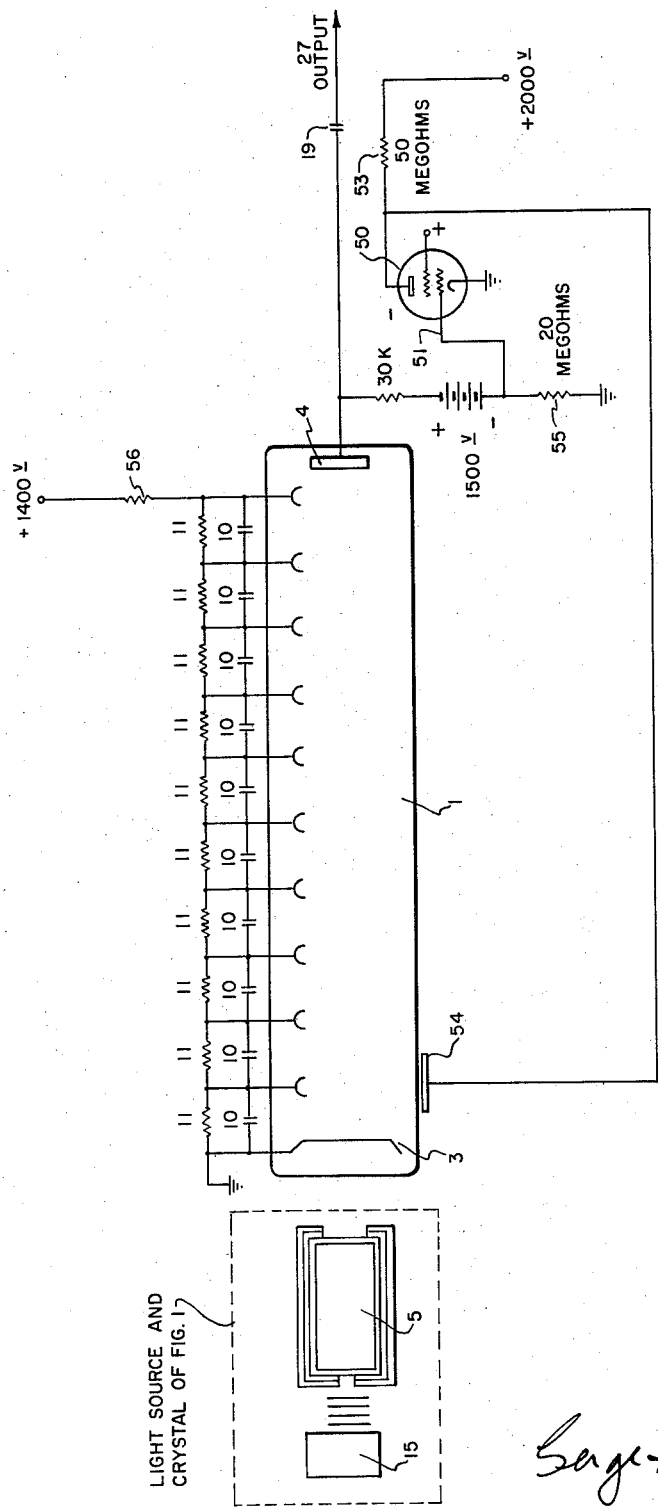

It is also obvious to those skilled in the art that there are many ways of defocusing or distorting the electron stream within the photomultiplier other than changing the dynode voltages or the anode voltage. There are numerous ways of distorting the electron stream; for example, magnetic deflection by a coil or electrostatic deflection by an external electrode placed outside the glass envelope of the photomultiplier. FIG. 6 illustrates diagrammatically the magnetic method. As was explained previously, when the photomultiplier gain increases the D.C. current due to the pilot light also increases, the current to the tenth dynode also increases and this dynode tends to become more positive. As is shown in FIG. 6, this positive potential is applied to the grid of tetrode 40 and causes a D.C. current to flow through the coil 42 which in turn defocuses the electron stream and tends to decrease the gain. Similarly, FIG. 7 illustrates the electrostatic method. When the photomultiplier anode current increases due to increased gain, a negative grid bias on the vacuum tube shown develops and the potential at the plate (normally close to zero) of the vacuum tube rapidly increases which causes the control electrode 301 to become more positive, thus defocusing the photomultiplier tube, with the consequent reduction in amplification. Other similar variations can be made without departing from the basic principle of my invention. For example, in FIG. 1 I have illustrated a control circuit employing linear resistors. It is, of course, possible to employ control circuits using transistors, gas discharge tubes, non-linear resistors, and many other types of components without departing from the principle of my invention.

I claim:
1. In an apparatus for detection and measurement of nuclear radiation, the combination comprising a phosphor adapted to produce scintillations in response to said radiation, a photomultiplier provided with a photocathode and a plurality of dynodes, said photocathode being optically coupled to said phosphor, said photomultiplier being operative to produce a first electric output signal responsively to and representing scintillations in said phosphor, a voltage supply for establishing a series of potential differences between said dynodes, said supply comprising means for establishing a definite, predetermined relationship among said potential differences, one to the other, and thereby determining the sensitivity of said photomulti- plier, a standard light source arranged to illuminate with a standard illumination the same area of said photocathode that is optically coupled to said phosphor, said photomultiplier being operative to produce a second electric output signal responsively thereto, means fed by said two electric signals for separating said second signal from said first signal, and means fed by said second signal and operatively associated with said voltage supply for varying the relationship of said potential differences to maintain the sensitivity of said photomultiplier substantially constant.

2. In an apparatus for detection and measurement of nuclear radiation, a phosphor adapted to produce scintillations in response to said radiation, a photomultiplier having a cathode operative to emit electrons responsively to impingement of light thereon and a plurality of dynodes operative to emit secondary electrons, said phosphor and said photocathode being optically coupled, said photomultiplier being operative to produce a first electric output signal responsively to scintillations in said phosphor, a voltage supply for establishing a series of potential differences between said dynodes, said supply comprising means operative to establish a definite magnitude relationship among said potential differences and thereby to determine the degree of focusing of electrons emitted by said photocathode and said dynodes, a standard light source arranged to illuminate with a standard illumination the same area of said photocathode that is optically coupled to said phosphor, said photomultiplier being operative to produce a second electric output signal responsively to said illumination, means fed by said two electric signals operative to separate said second signal from said first signal, and means fed by said second signal and coupled to said voltage supply operative in response to changes in said second signal to vary the relationship among said potential differences and thereby to vary the electron focusing in said photomultiplier, the variations in focusing being of such sense and magnitude as to tend to stablize the photomultiplier sensitivity.

References Cited by the Examiner
UNITED STATES PATENTS

| | | | |
|---|---|---|---|
| 2,198,233 | 4/1940 | Snyder | 250—207 |
| 2,412,423 | 12/1946 | Rajchman | 250—207 |
| 2,957,988 | 10/1960 | Fearnside | 250—71.5 |
| 2,994,782 | 4/1961 | Gouyon | 250—207 |
| 3,030,509 | 4/1962 | Carlson | 250—71.5 |

RALPH G. NILSON, *Primary Examiner.*

JAMES W. LAWRENCE, *Examiner.*